(No Model.)

11 Sheets—Sheet 1.

J. L. McMILLAN.
TYPE SETTING MACHINE.

No. 347,626. Patented Aug. 17, 1886.

WITNESSES
F. L. Ourand
Walter J. Dodge

INVENTOR,
JOHN L. McMILLAN,
by Dodge & Son
Attorneys.

(No Model.)
11 Sheets—Sheet 2.

J. L. McMILLAN.
TYPE SETTING MACHINE.

No. 347,626.   Patented Aug. 17, 1886.

WITNESSES
F. L. Durand
Walter A. Dodge

INVENTOR,
JOHN L. McMILLAN,
by Dodge & Son,
Attorneys.

(No Model.)  11 Sheets—Sheet 3.

J. L. McMILLAN.
TYPE SETTING MACHINE.

No. 347,626.  Patented Aug. 17, 1886.

WITNESSES
F. L. Ourand.
Walter S. Dodge

INVENTOR,
JOHN L. McMILLAN,
by Dodge Son
Attorneys.

(No Model.) 11 Sheets—Sheet 4.

J. L. McMILLAN.
TYPE SETTING MACHINE.

No. 347,626. Patented Aug. 17, 1886.

WITNESSES
F. L. Ourand
Walter S. Dodge

INVENTOR,
John L. McMillan,
by Dodge Son,
Attorneys

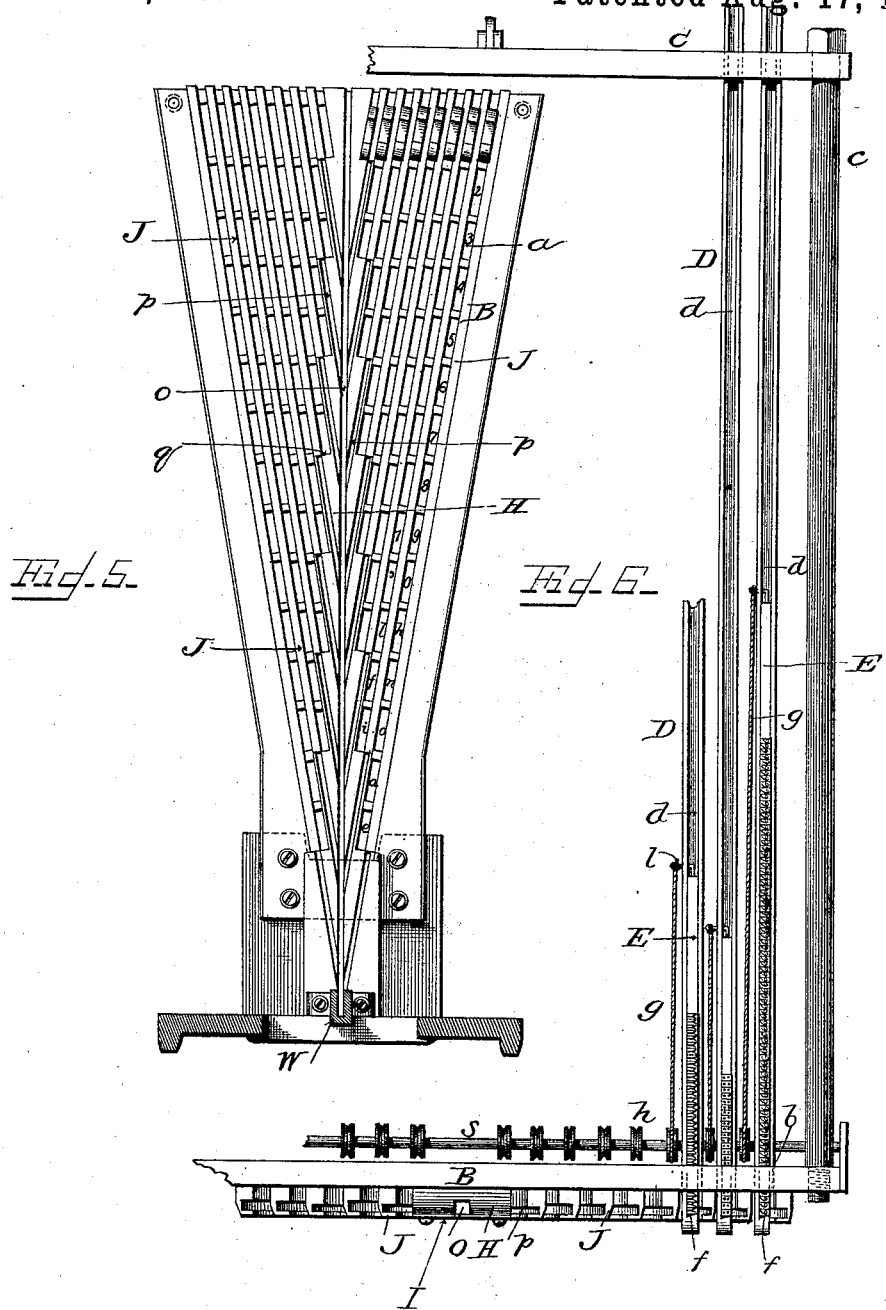

(No Model.)　　　　　　　　　　　　　　　　　　　11 Sheets—Sheet 6.
J. L. McMILLAN.
TYPE SETTING MACHINE.
No. 347,626.　　　　　　　　　　　Patented Aug. 17, 1886.
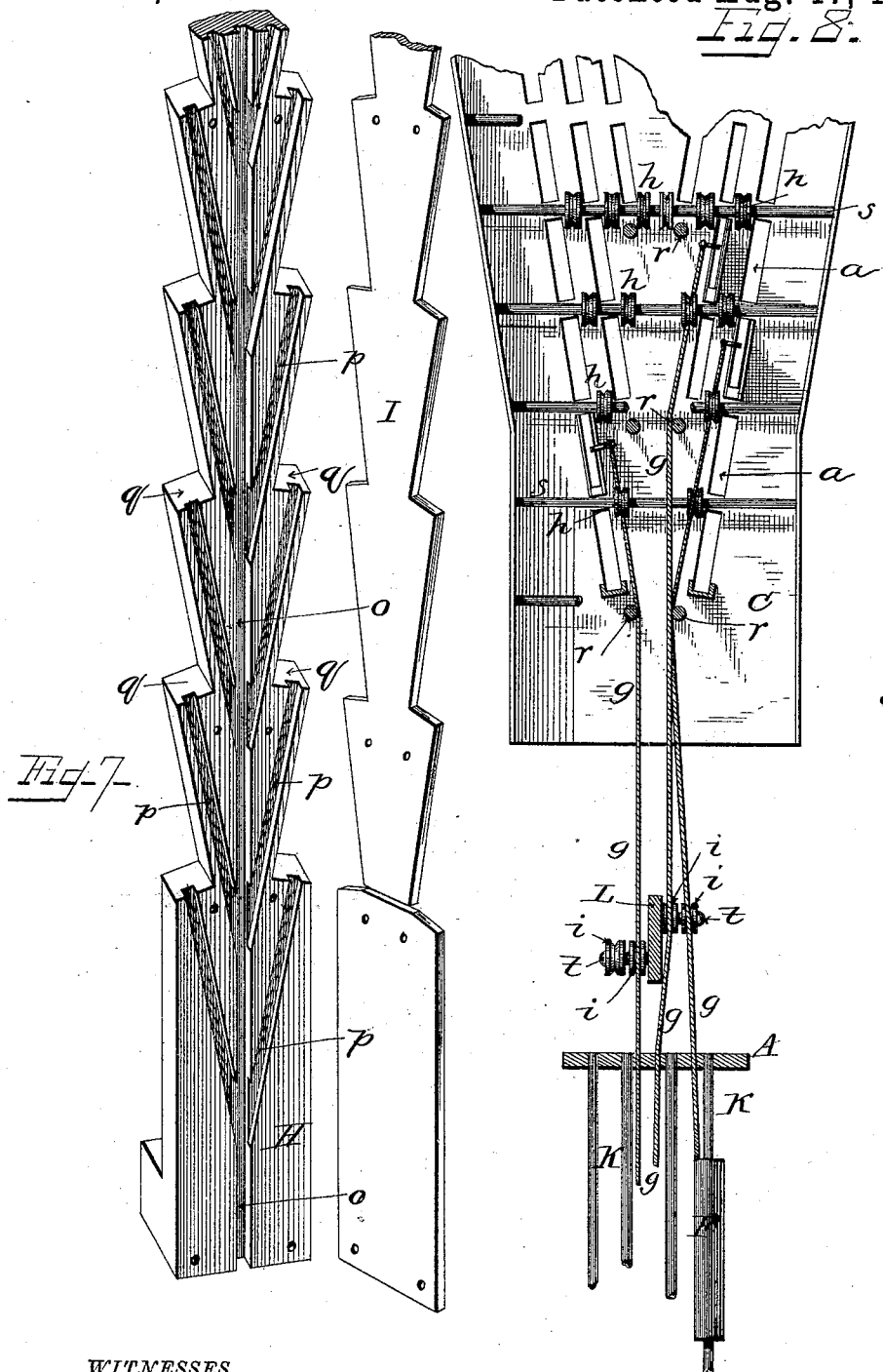
WITNESSES
INVENTOR,
JOHN L. McMILLAN,
by Dodge & Son,
Attorneys.

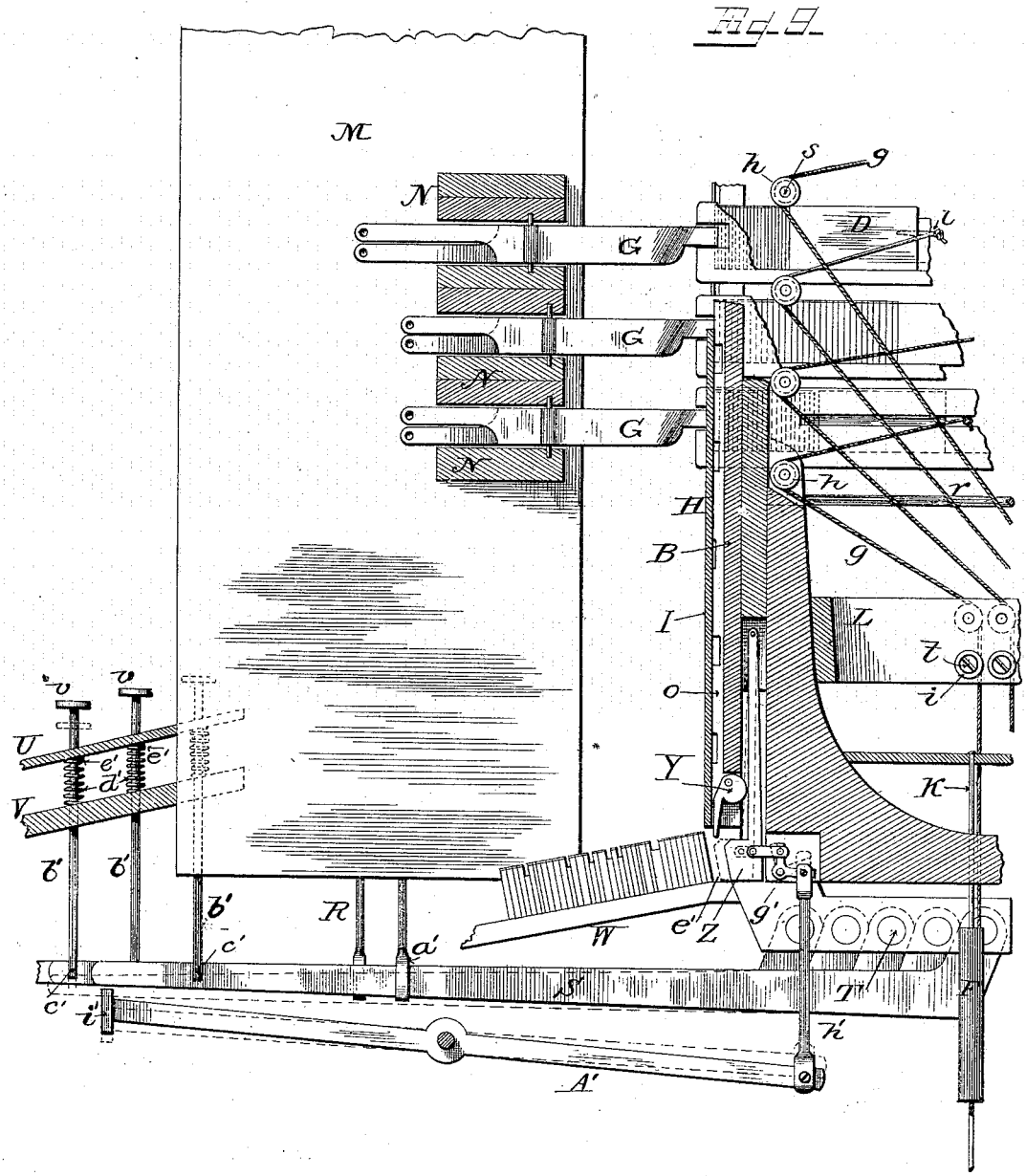

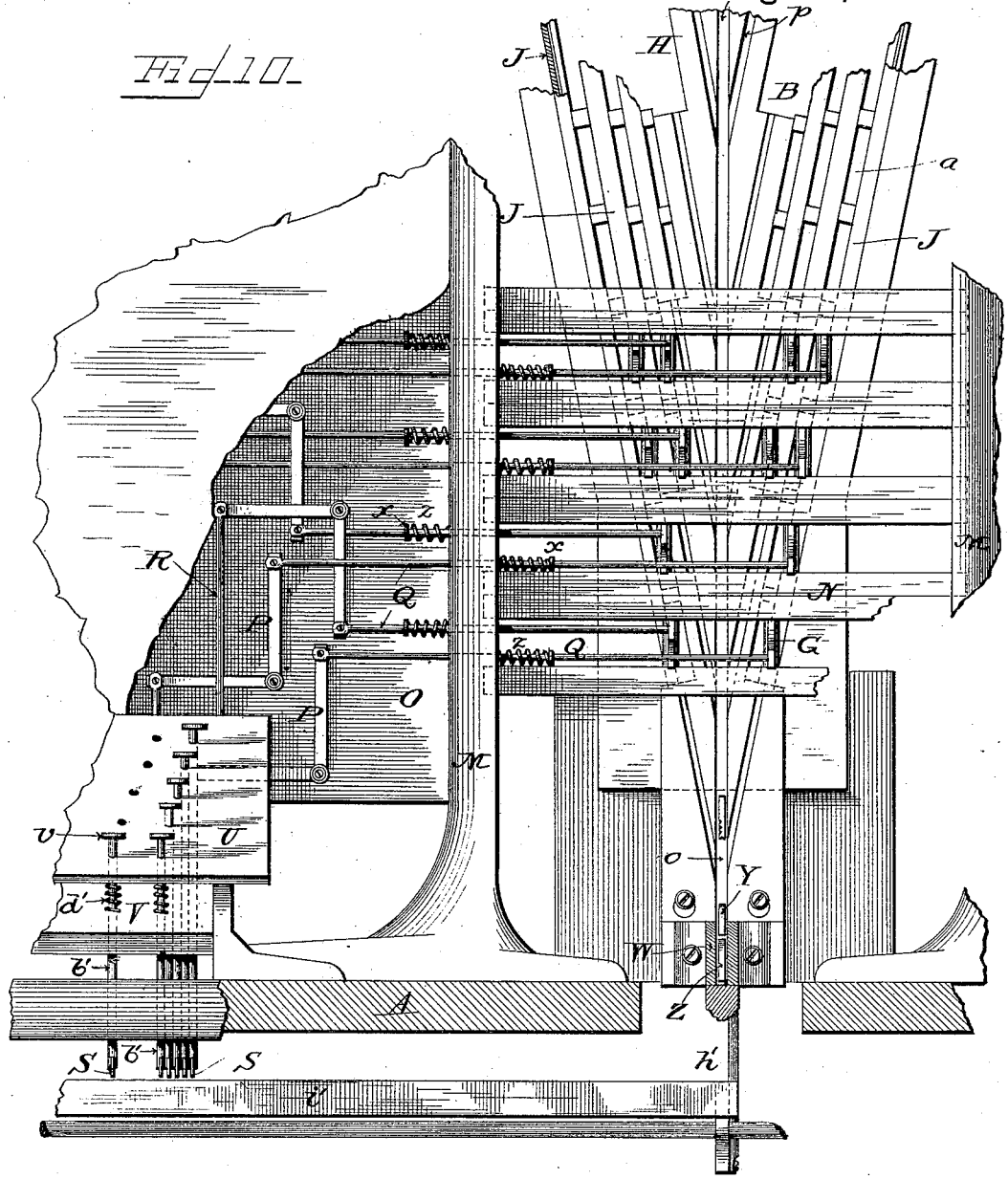

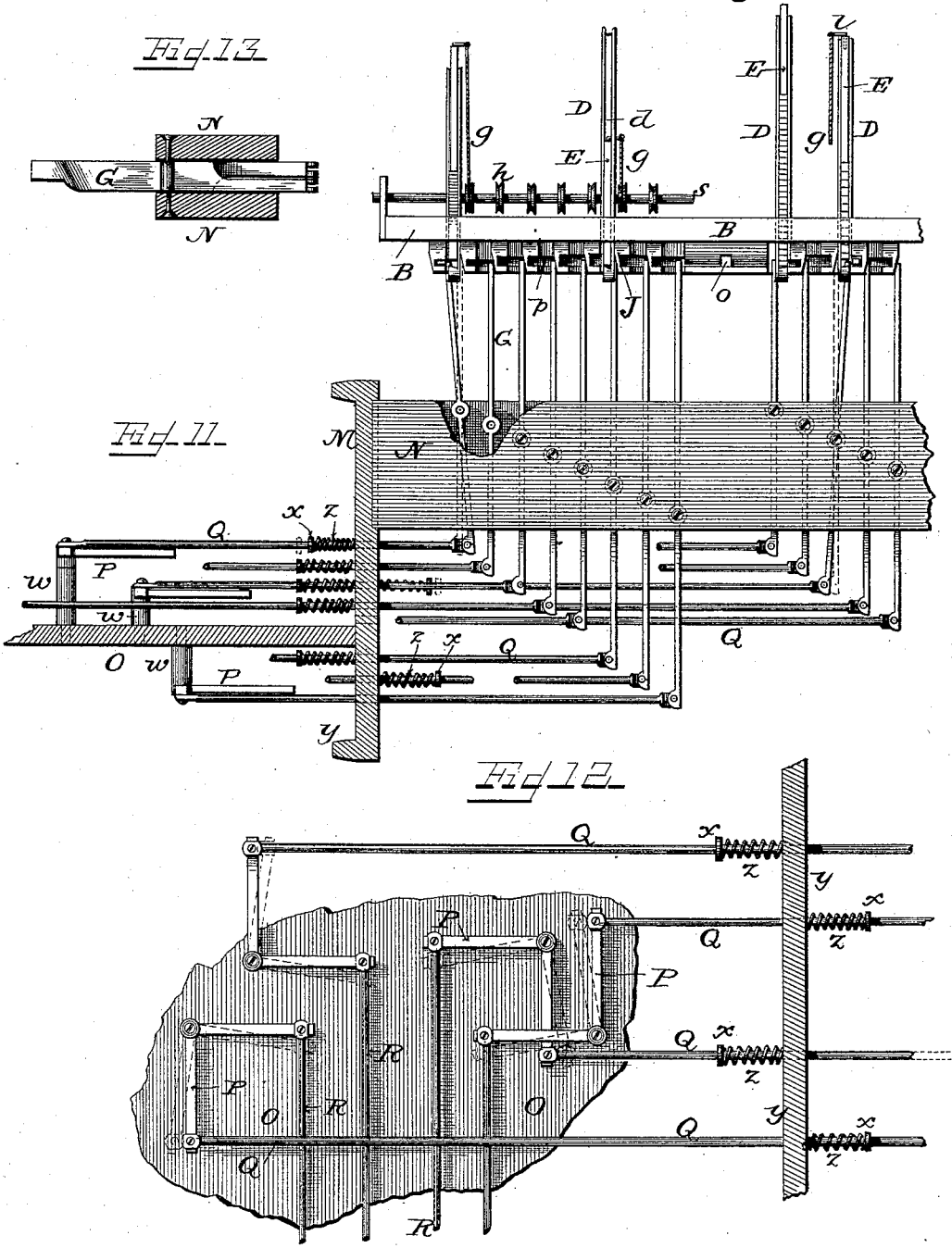

(No Model.) 11 Sheets—Sheet 10.

J. L. McMILLAN.
TYPE SETTING MACHINE.

No. 347,626. Patented Aug. 17, 1886.

WITNESSES
F. L. Durand.
Walter S. Dodge.

INVENTOR,
JOHN L. McMILLAN,
by Dodge Son,
Attorneys.

N. PETERS, Photo-Lithographer, Washington, D. C.

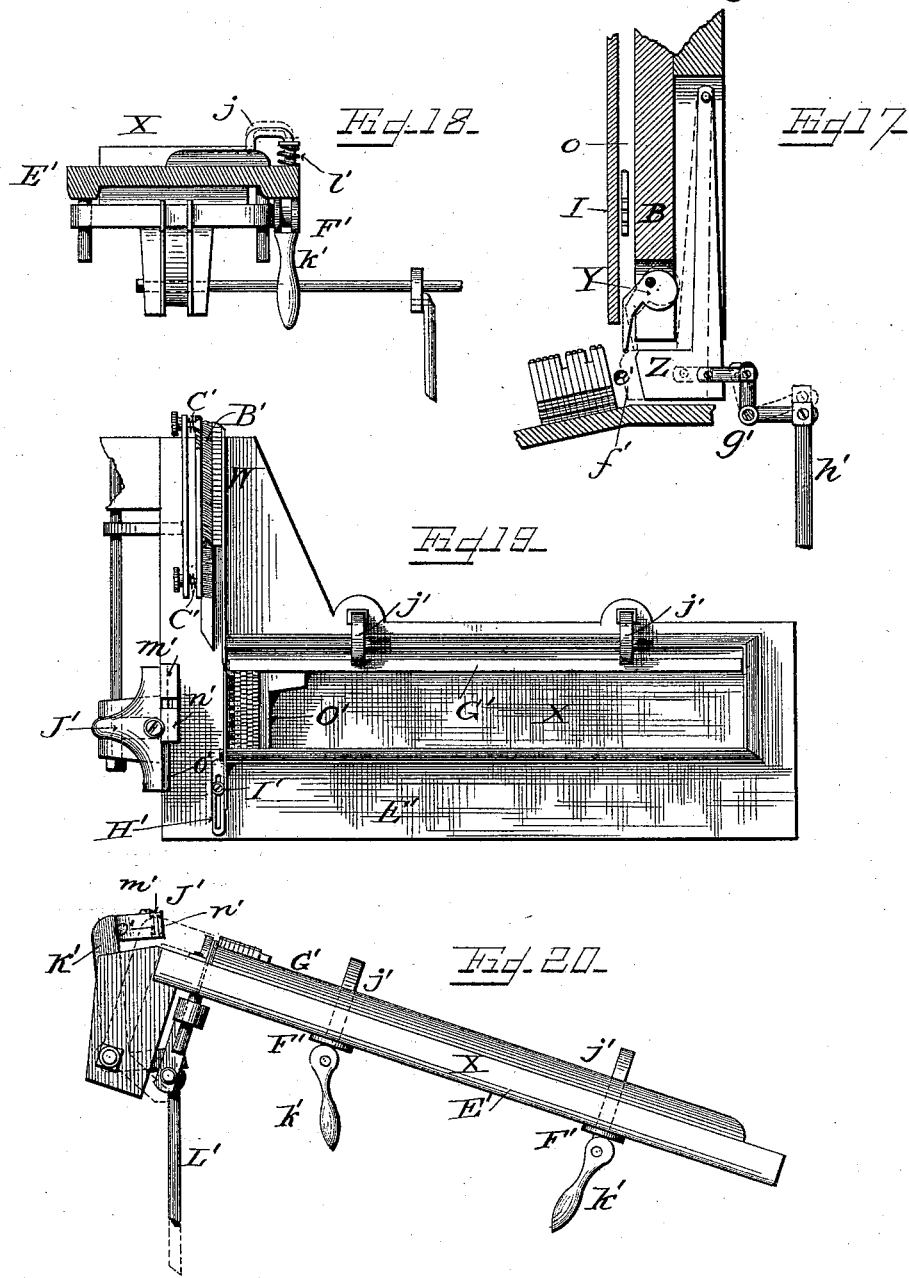

UNITED STATES PATENT OFFICE.

JOHN L. McMILLAN, OF ILION, ASSIGNOR OF ONE-HALF TO JOSEPH FOWLER, D. L. ROBERTSON, T. S. COOLIDGE, AND J. W. BUSH, ALL OF GLENS FALLS, NEW YORK.

TYPE-SETTING MACHINE.

SPECIFICATION forming part of Letters Patent No. 347,626, dated August 17, 1886.

Application filed July 14, 1884. Serial No. 137,699. (No model.)

*To all whom it may concern:*

Be it known that I, JOHN L. MCMILLAN, of Ilion, in the county of Herkimer and State of New York, have invented certain new and useful Improvements in Type Setting Machines, of which the following is a specification.

My invention relates to type-setting machines; and it consists in various novel features and details of construction, combinations, and sub-combinations of parts hereinafter fully set forth and claimed.

Figure 1:
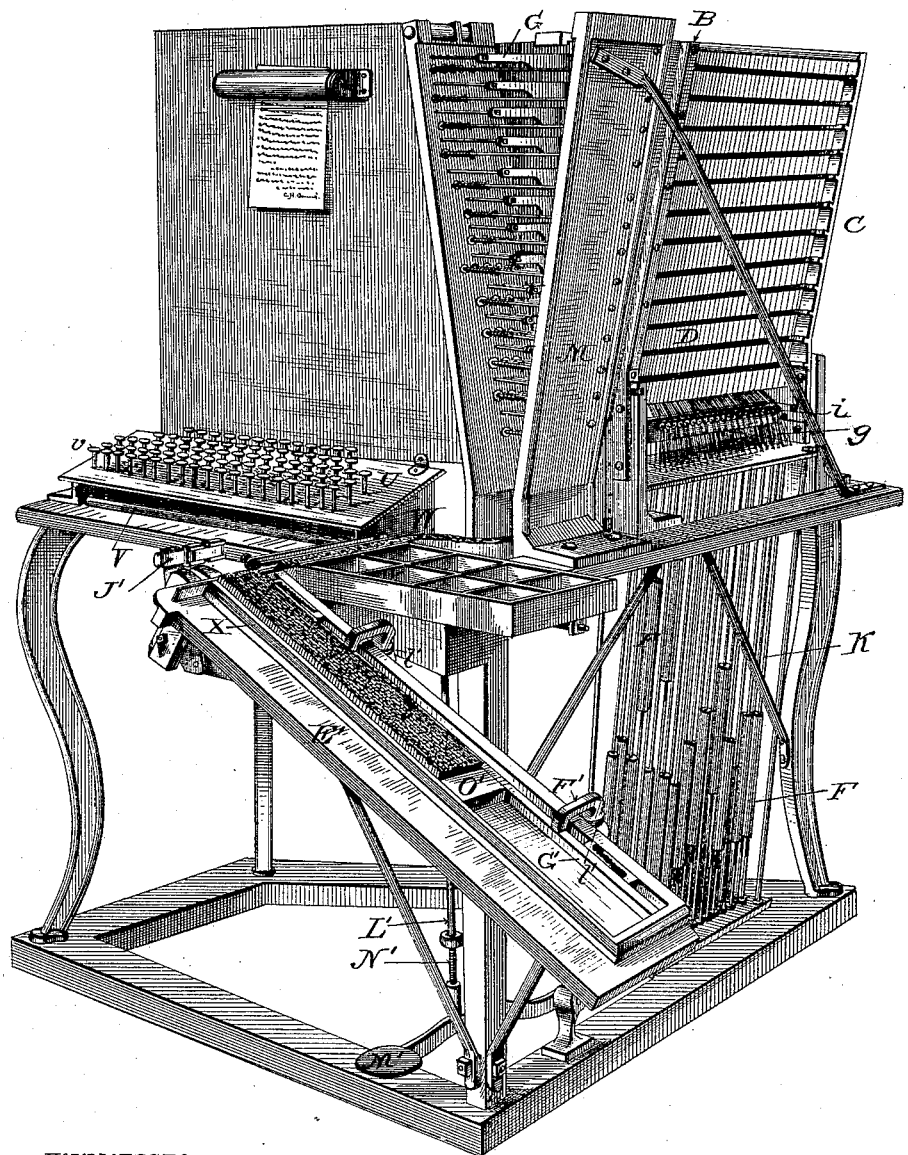
Figure 2:
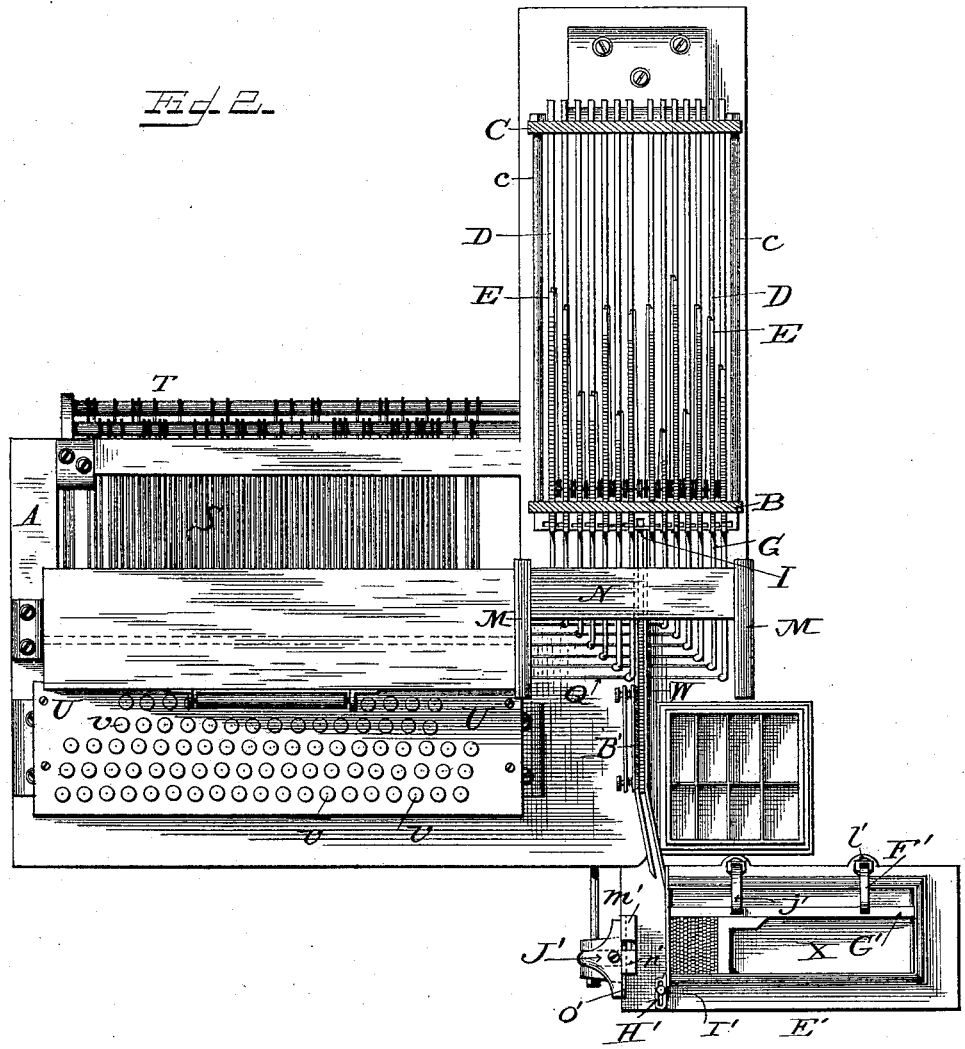
Figure 3:
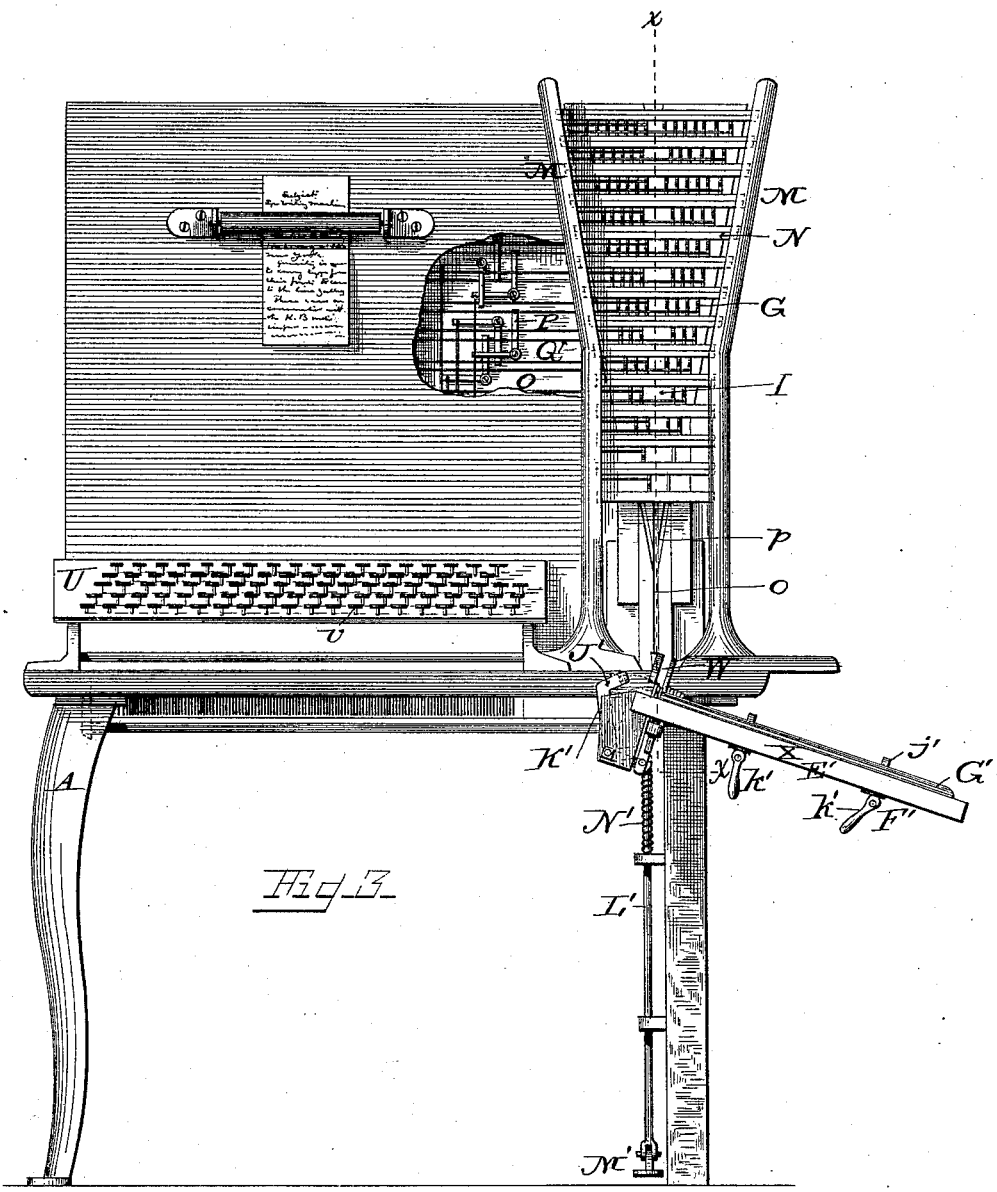
Figure 4:
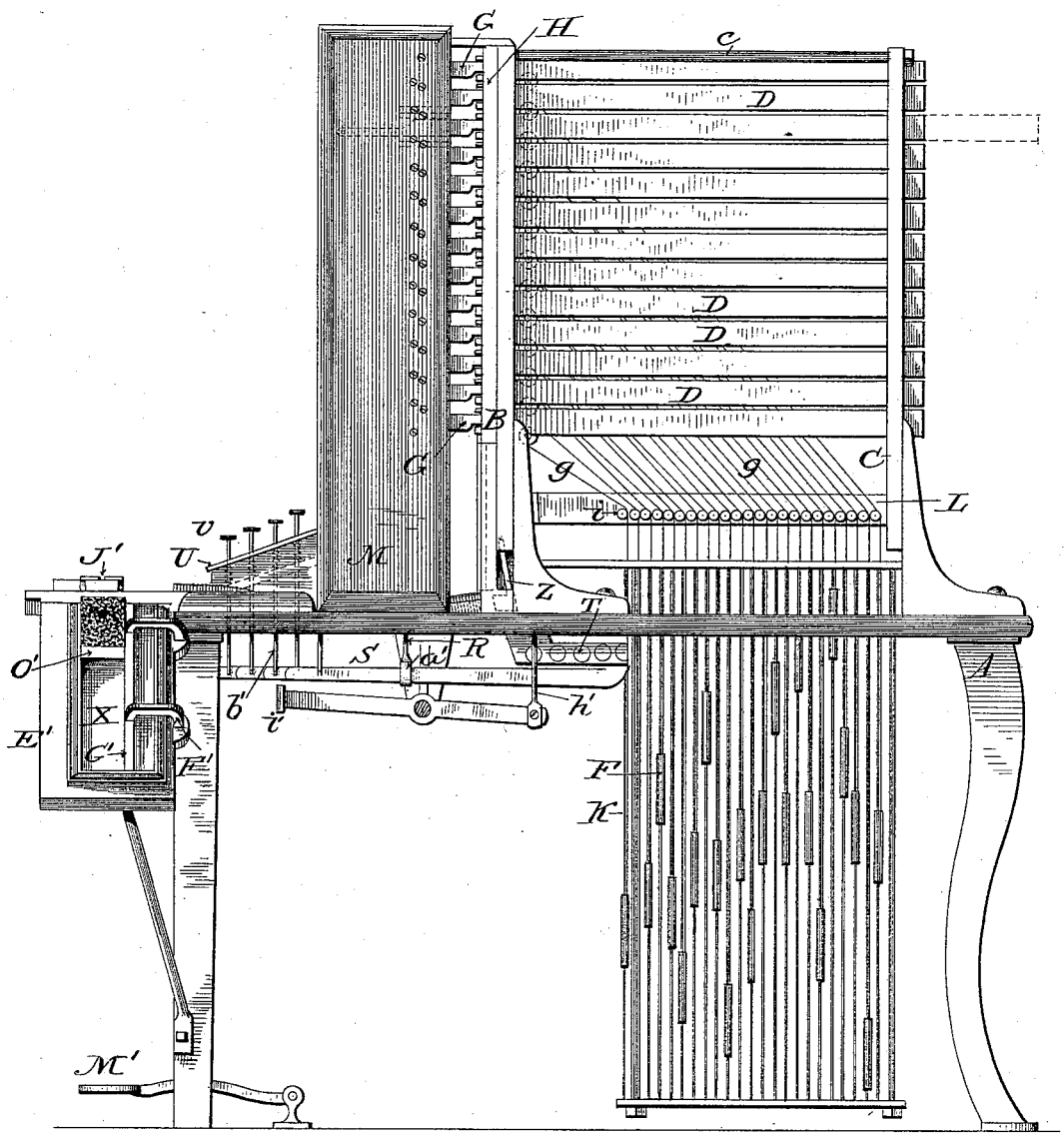
Figure 16:
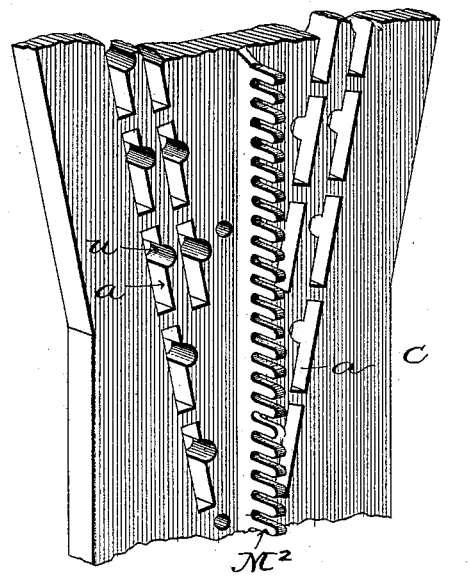
Figure 14:
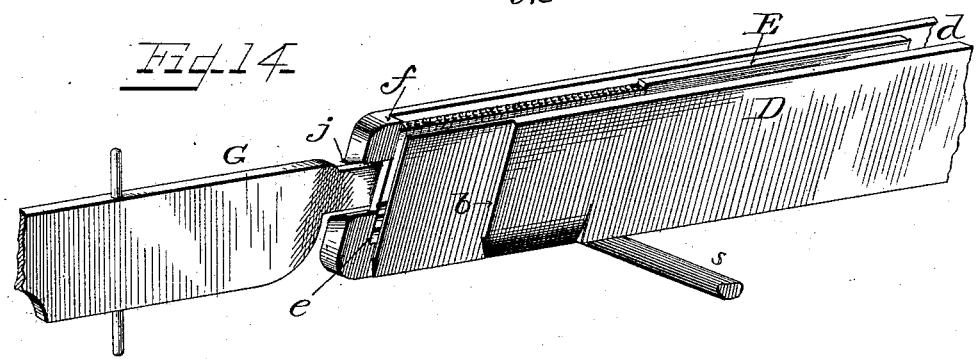
Figure 15:
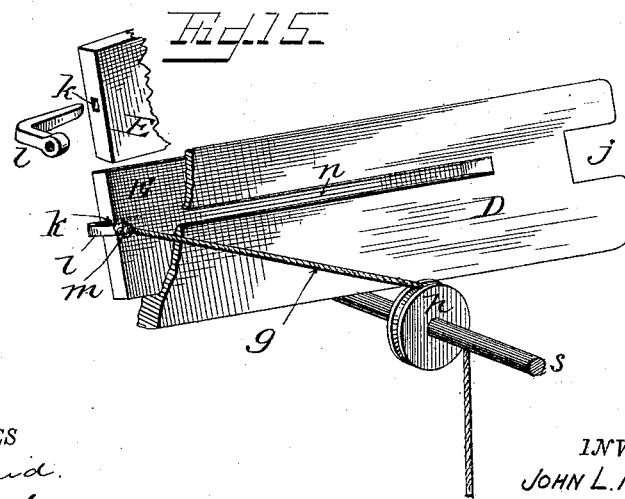

In the accompanying drawings illustrating my invention, Figure 1 is a perspective view of the machine as it appears when complete and ready for use; Fig. 2, a top plan view of the same; Fig. 3, a front elevation; Fig. 4, a side elevation; Fig. 5, a front end of the type-cases, the frame which supports them, and the races through which the type fall; Fig. 6, a top plan view illustrating the construction of the frame which supports the type-cases, showing also the arrangement of said cases, the races through which the type descend, and the cords which connect the type-followers with their operating-weights; Fig. 7, a perspective view of the central bar containing the main race and the lower ends of the branch races; Fig. 8, a rear face view of the front plate of the type-case holder. Fig. 9 is a vertical sectional view on the line *x x* of Fig. 3, illustrating the mechanism for ejecting the type from their cases, the gate at the foot of the main race, and the pusher or bunter which moves the type line forward; Fig. 10, a front elevation partially broken away to show the bell-crank levers, rods, and springs, by which the ejecting-fingers are moved; Fig. 11, a plan view of the same; Fig. 12, a view illustrating different arrangements of the bell-cranks to produce a push or pull, as required; Fig. 13, a detail view of the ejecting-fingers, showing how two are placed at the same level and the rods connected with each without conflicting; Figs. 14 and 15, detail views of the type-cases; Fig. 16, a perspective view of a portion of the rear plate of the type-case supporting-frame, showing a rack provided to hold the weight-cords of cases that are withdrawn; Fig. 17, an enlarged view of the gate and pusher or bunter at the foot of the central race; Figs. 18, 19, and 20, views illustrating the construction and arrangement of the galley, holding devices, gage, and reciprocating head for pressing the lines of type into the galley.

This machine is designed with special reference to compactness, simplicity, efficiency, and durability, all of which points are secured in an eminent degree by the construction which I shall presently explain.

Points in which other machines have proven defective have shown where modification was needed, and, profiting by such demonstration, I have succeeded in arranging all the type cases or holders in a compact group in superposed tiers, all of said cases delivering their type into a central race through the medium of connecting-races, each common to a series of type-cases. By arranging the type-cases in a series of horizontal lines one above another I am enabled greatly to reduce the width required for the cases, and by making one race answer for all the type cases in line therewith I produce the number of races required. This plan of arranging the type-cases in series possesses also the further advantage that type of a given thickness being made to fall into the same race such race can be made to afford an easy and certain guide therefor, in which they cannot turn, as the thin ones might do if delivered into the races of the thicker type. These and other advantages of my improved construction will be more readily understood upon referring to the drawings, in which—

A indicates a frame or table, advisably of metal, and well braced to prevent vibration or unsteadiness. Upon this table or frame are bolted or otherwise secured two vertical plates, B and C, of wedge-form, wider at their upper than at their lower ends, as indicated in Figs. 1 and 8, and placed a distance apart somewhat less than the length of the type-cases D, which they support. Both plates, B and C, are formed with openings *a* for the introduction of the type-cases, those of the rear plate, C, being slightly wider than those of the front plate, B, for the reason that the forward ends of the type-cases are each made thinner by cutting away one side, in order to form on each a shoulder, b, which, abutting against the back face or plate, B, forms a stop to limit the forward movement of the type-case, and to insure its finding the exact position required, as shown in Fig. 14. The plates B and C are tied together and braced by the tie-rods c.

Referring now to Figs. 14 and 15, the construction of the type-cases will be explained. Each case consists of a grooved flat bar closed at the bottom and sides, but open at the top, the groove d being a width corresponding to the width of the type in the direction of the height of the letter and of depth equal or about equal to the length of the type. The rear end of the groove may be open or closed. The forward end of the type-case is not grooved longitudinally, but is made solid from side to side, as shown in Figs. 14 and 15. Immediately in rear of the solid portion, however, is formed a lateral opening, e, of a width just sufficient to permit a single type to pass through at a time, the type being placed on end in the case, side by side, and face uppermost. This construction produces at the front end of the groove d a solid abutment, f, against which the type are pressed by a follower, E, which is urged forward by a weight, F, connected therewith by a cord, g, passing about pulleys h and i, which serve to guide the cord, insure a straight pull upon the follower, and prevent the cord from catching or becoming worn. The face of abutment f may be slightly beveled or inclined backward from the edge of the lateral opening or outlet e, as shown in Figs. 6 and 14, so that the type pressed against said face or abutment will be held thereby against falling out too readily through the opening e, though yielding readily to the pressure of the ejecting device, which consists of a laterally-swinging finger, G, more fully described later on. In order that the ejecting-finger may act upon the type and move them one at a time through the opening e, the forward end of each type-case, D, is formed with an end mortise or open space, J, just a little wider than the end of the finger, and extending inward to or slightly beyond the rear side of outlet-opening e, as plainly shown in Fig. 15. The follower E is simply a flat block of metal, of a size to fit and move easily within the slot d, and is provided at its rear end with a hole or socket, k, to receive the stem of a cord-hook, l, of the form shown in Figs. 6, 9, and 15, the stem and its socket being preferably square in form, and the hook being formed with a lateral arm containing an eye, m, for attachment of the cord. The lateral arm of the hook passes through a slot or opening, n, formed in the side of the type-case D, and extending nearly from end to end thereof. By reason of the square form of the hook-stem and its socket the hook is caused to retain a fixed position and is prevented from tipping, dropping down, or coming into contact with the walls of the slot n, through which it moves. It is also made slightly tapering, to insure its fitting tightly within the socket. Of these type-cases I provide a number equal to the entire number of characters employed, upper and lower case, punctuation-marks, figures, &c., and these I arrange in tiers or horizontal rows, one row above another, as shown in Figs. 5 and 10, the cases of the several rows being inclined slightly from a vertical line or tipped edgewise, and in reverse directions on opposite sides of a central line. All the cases have an equal inclination, and those of each tier are arranged in line with those of the other tiers above and below, all inclining inward and downward toward the central dividing-line. At said center or middle of the group of type-cases, and at the forward ends thereof, I place a race-bar, H, (see Figs. 5, 7, 9, and 10,) which has a central vertical groove or race, o, of a width just enough greater than the measurement of the type in the direction of the height of the letters to permit the type to move freely therein, and of a depth from front to rear sufficient to receive the thickest type of the font and permit it to move freely therein when a covering-plate, I, is applied to the bar H, as shown in Figs. 2, 3, 6, 7, 9, and 17. From the main or central race, o, branch races p extend upward and outward at an angle exactly corresponding to the inclination of the type-cases.

By an examination of the figures referred to, particularly Figs. 5 and 7, it will be seen that the race-bar H is made with a series of shoulders or offsets, q, at each side of the center, and at the same height on both sides of the center; or, in other words, the bar has the appearance of a series of wedge-shaped or tapered sections placed on end, one above the other, with their wider ends uppermost. The lateral or branch races p run from the main race up to the tops of the offsets or shoulders q, as shown. Resting upon and extending upward from each of the shoulders or offsets q is a race-bar, J, containing a groove which forms a continuation of the branch race which meets it at the shoulder on which it rests. The various race-bars J extend up to a uniform or nearly uniform height, and pass close to the sides of the forward ends of the type-cases D, each race coinciding with the outlet-openings e of one line or series of type-cases. The groove of each race is formed in its side face, and the race passes up by the outer side of the series of type-cases, so that as the type are pressed by the ejecting-finger G into the race they will have an inclined surface upon which to slide down to the main race, and they will be prevented by such inclination from leaving the race or turning end over, as they might do in a vertical race open at the side, as are these.

In arranging the type-cases in the frame or holder I classify them in two, three, or more groups or classes. Thus, f, i, j, l, and other small letters of the lower-case are included in one group, w, m, and other very broad letters of intermediate thickness in another or other groups, and the same plan is followed with the larger letters, which are or may be included in the same groups, the same distinction being made as to thickness, though of course the same letters of upper and lower cases will not be included in the same classes or groups. These groups run in lines up and down or parallel with the races, as many of one class as there are tiers communicating with the same race being arranged one above another. Thus, for instance, we may take the first group to the right in Fig. 5, where the figures 2, 3, 4, 5, 6, 7, 8, 9, and the cipher, together with letters of about the same thickness—as, for instance, h, n, o, e, &c.—are indicated as embraced in the same group; or, taking the next group, we find the figure 1, apostrophe, quotation-marks, and letters f, l, and i in the same series. The arrangement may of course be varied as desired, but the principle should always be observed of placing one above and in line with another those type-cases containing type most nearly alike in thickness. Each race has its groove made of a depth equal to the height of the type, or their measurement in the direction of the height of the letters, and just enough wider than the thickest type of the series to which it belongs to permit all to slide freely therein, and the continuations of the branch races in the central race-bar correspond exactly in dimensions with the races of the race-bars with which they communicate.

The type-cases, being constructed as above described, are passed through the openings $a$ of the back plate, C, thence through the corresponding openings of the forward plate, B, one case at a time, each case being first supplied with type of its special letter or character and with the follower H. Before the type-case has its end passed to plate B the cord-hook $l$ has its stem passed through the slot $n$ of the case, and has its squared stem inserted into the socket of the follower. The weight F, pulling upon the cord and hook, urges the follower forward, which presses upon the type, and these against the abutment or solid fore end of the type-case, carries said case forward, and leaves the operator with nothing more to do than to properly guide the fore end of the type-case into the opening in plate B, through which it passes until its shoulder $b$ abuts against the rear face of said plate, thus forming a limit and gage for the placing of the case. The weight F acts constantly not only to press forward the line of type to supply the place of those used, but it also serves to retain the type-case in place by urging it forward and holding its shoulder $b$ up against the plate B.

In order that the weights F and their cords (of which there is one of each for every type-case) may not become entangled or in any way interfere with each other, I make said weights of tubular form and arrange them to slide upon fixed guide-rods K, as shown in Figs. 1, 4, and 8; and to still further insure the non-interference of the cords with each other or with the cord-hooks or type-cases with which they are not connected, and in order especially that they may not draw across the line of a type-case when the letter is removed, I provide, at suitable points, guide-rods $r$, over which the cords pass, and by which they are held away from the type-cases and made to clear their hooks, as will be better understood upon referring to Figs. 8 and 9. The weight-cords $g$ pass forward to pulley $h$, mounted upon rods $s$, and thence downward and backward to and over pulleys $i$, secured by screws $t$ to a bar, L, connecting the plates B and C, and serving to brace and stiffen them, each screw $t$ bearing two pulleys. The rear plate, C, is provided with a vertical central rib, $M^2$, notched to form a rack or comb, as shown in Fig. 16, into which to catch or lay the end of the cord $g$ of any type case or cases that may be removed, the cord being prevented from escaping by the hook $l$, which is too large to pass through the notches. In this way the cords are prevented from getting out of reach, and are kept in position ready for attachment each to the follower of its particular type-case. It will be observed also in explaining Fig. 16 that the openings $a$ of rear plate, C, are provided with a notch or lateral enlargement, $u$, at one side to permit the lateral arm and eye of the cord-hook to pass through.

Directly in front of plate B of the type-case frame or support is a V-shaped frame, M, having a series of horizontal cross bars or plates, N, between which the ejecting-fingers G are pivoted and work, the space between plates being about equal to the height of a type-case, and each such space being in the same horizontal plane with a tier of the type-cases, as plainly shown in Figs. 9 and 10. At one side of this frame M is a vertical plate or board, O, upon which are pivoted elbow-levers P, which levers are connected by rods Q with the ejecting-fingers G and by rods R with finger-levers or key-bars S, as shown in Figs. 3, 4, 10, 11, and 12, the levers or key-bars being furnished with buttons $v$ in the same manner as in the ordinary type-writer. The ejecting-fingers G are made of different lengths, the variation in length being made in order that their rear ends may extend back or outward different distances from the ends of the type-cases and stand out of line with each other, as shown in Fig. 11, to permit the passage of the rods Q from the elbow-levers or bell-cranks P to the ejecting-fingers in parallel lines and without conflict or collision. By referring to said Fig. 11 it will also be seen that the bell-cranks or levers P are set away from the supporting-plate N different distances on each side, their supporting-brackets $w$ being of different lengths, as shown, to thus vary their positions relatively to the plate.

By referring to Figs. 9, 10, and 13 it will be seen that the tail of each ejecting-finger is cut away back of the pivot, so as to be of only about one-half the width of the body of the finger, this being done in order to permit two series of rods to pass between the same pair of plates or cross-bars N, one series above the other. In this way I am enabled to employ two sets of ejecting-fingers pivoted at various distances from the ends of the type-cases, as shown in Fig. 11. By this arrangement I am enabled to place a larger number of fingers between each pair of cross bars or plates N, sixteen being indicated in Fig. 11, which is the largest number ordinarily used, the number growing less on going down the series or tiers of type-cases, because the number of cases in the tiers grows less toward the bottom. As the type-cases are inclined, the forward or inner ends of the ejecting-fingers G are slightly twisted or bent to conform to the inclination of the cases, as shown in Fig. 9, the inclination being reversed on opposite sides of the main race $o$ to correspond to the reversed inclination of the type-cases.

It will be seen by referring to Figs. 6 and 11 that the open sides of the race-bars J are turned inward toward the central race-bar, and in order to discharge the type from the cases into the race-bars J the ejecting-fingers G must swing outward or away from the central race-bar in their ejecting-stroke, and those at one side of the central race-bar must move in the opposite direction from those at the opposite side thereof, all being controlled by a depression of the key-bars S. This result I attain by varying the position of the elbow-levers or bell-cranks P, as shown in Fig. 12. Thus, if it be desired to have them pull upon the rods Q, the latter extending to the right, the levers may be set with one arm in a horizontal position to the left of the pivot, and the other arm extending vertically above the pivot, or by exactly reversing said position; and if it be desired to produce a pulling action the horizontal arm may likewise extend to the left of the pivot, and the other arm extend vertically below the pivot; or this position of the bell crank may be exactly reversed, the position adopted being dependent upon circumstances, and particularly upon the amount of available room that may be secured under such arrangement.

Those ejecting-fingers to the right of the central race, $o$, swing to the right in ejecting the type from their cases, and hence require a pulling action upon their tails or in rear of their pivots, while those to the left move to the left in ejecting type from the type-cases, and therefore require a pushing action of the connecting-rods Q.

As shown in Fig. 11, the rods Q are each provided with a collar, $x$, the push-rods having said collar located to the left of the side plate, $y$, of the V-shaped frame M, and the pull-rods having said collar located to the right thereof. Between these collars and the side plate, $y$, springs $z$ encircle the rods, and, bearing against the collar and plate at their ends, serve to restore the rods to the position from which they are moved in actuating the ejecting-fingers, and of course to restore said fingers to their normal position.

Referring now to Figs. 2, 4, and 9, the arrangement of the key-levers will be explained. It is of course desirable that each key should offer the same amount of resistance to the finger in being depressed, but, owing to the fact that the keys or key-buttons $v$ must be set in rows or ranks in order to bring them within a reasonable and convenient space, and also to the further fact that the elbow-levers P are necessarily set at different distances from the keyboard, it is manifestly impracticable to secure such uniform resistance if the key-bars have a common pivot-rod, because to avoid interference with each other the rods R must descend vertically from the bell-crank levers to the keybars. I secure the desired end by employing a series of pivot-rods, T. The pivot-rods T are set nearer to or farther from the front of the key-board to correspond with the position of the keys or buttons of the key-bars pivoted thereon and the relative position of the crank-levers connected with such bars, as will be understood upon referring to Figs. 4 and 9. The rods R are connected with the key bars or levers S by loops or stirrups $a'$, which pass around the bars, and into which the lower threaded ends of the rods R are screwed, an arrangement which permits the height of the free end of the key-bars to be readily adjusted by simply screwing the rod R into its loop more or less, as required. At the forward or free end of each key-bar there is attached to it a vertical stem, $b'$, forked at its lower end to straddle the key-bar, and pivoted or jointed thereto by a rivet or pin, $c'$, as shown in Fig. 9. Each stem $b'$ passes upward through two parallel plates, U and V, which lie one above the other in a nearly horizontal position, as shown in Fig. 9, with a space between them of from half an inch to an inch or thereabout, the forward edge of the plates being preferably depressed somewhat, so that the key-board which they form shall be somewhat inclined. Each stem $b'$ is encircled by a spiral spring, $d'$, which rests at its lower end upon the plate V, and bears at its upper end against a collar, $e'$, on the stem $b'$, thus serving to raise the stem and its key-bar after it is depressed and the pressure of the finger is removed from the key-button $v$, secured upon the upper end of the stem $b'$. The buttons $v$ are at such height above plate U V as to permit the stems to be depressed the necessary distance to move the key-bars and actuate the ejecting-fingers without causing the buttons to bear upon said plate. With the parts thus constructed and arranged the depression of any key or button will cause a type of the character represented upon said button to be ejected laterally through the outlet of its case and into the branch race passing said outlet, through which branch it passes into the central race, $o$, and falls to the bottom thereof, where it enters a line-galley or grooved bar, along which the type are carried in a single line to a galley, X, located at a suitable point, where the line is divided up into shorter lines and carried into the galley, spaced, justified, and corrected by an attendant whose business it is to attend to that part of the work, while the operator of the machine attends solely to the manipulation of the keys.

As the type fall a considerable distance, particularly those from the upper tiers of cases, there is a tendency to rebound, in doing which they would be liable to turn sidewise and also to clog the passage-way or central race, thus interfering with the fall of other type, if no provision were made for counteracting such tendency. To obviate this, I provide at or near the lower end of the central race a gravitating or pendulous gate, Y, (shown in Figs. 9 and 17,) which springs back before the pressure of impulse of the descending type, but immediately returns to a position within or across the race, thus preventing the type from rebounding within the race and tipping the upper end of the type forward against the preceding one, as in Figs. 9 and 17. The gate Y tends to straighten any of the thin type that may become partly turned, as now and then happens, and it in a measure retards the fall of the heavy type, and consequently lessens the impact which would be liable in time to batter the type and slightly reduce their length. It will be observed by referring to said Figs. 9 and 17 that the pendulous gate is pivoted close to the interior wall of the race, and that the upper face, or the portion against which the type strike, is beveled, while the front face below said beveled portion is straight and affords a considerable extent of surface to bear against the type passing in front of it. This form is important in view of the fact that in the practical operation of the machine it is canted slightly forward by placing small blocks under the rear feet, and that in consequence the type slide down their races in contact with the outer walls or faces thereof, the thin type striking the beveled face of gate Y farther from the pivotal center than the thick type, and thus acting with greater leverage than the thicker type, which, owing to their greater weight, require less leverage to force back the gate. In this way all the type are retarded precisely alike. The straight front face of the gate gives the gate a longer action on the type than would be given were the face rounded or only a single point of bearing afforded. The location of the gate at the point shown and described prevents the rebound of the type, which, with a practically vertical fall, would otherwise occur. It is also to be noted that, being located in the main race, through which every type passes singly and in precisely the same relation to the gate, and being only the width of the single race, said gate acts upon each type in a manner and with a degree of certainty and uniformity that would be impossible were the gate hung at the side or at the back of a space, into which several chambers open, and into which the type enter at varying angles, some in line with the length of the gate and some at a marked angle thereto.

It is essential to the prompt and efficient action of the gate that its pivot or point of suspension be at or near the line of the top of its beveled face, in order that the time required for it to swing across the main raceway be as short as possible. Otherwise it would be impossible for the pendulous gate, unaided by a spring or other device, to swing in time to act upon each type, the length of time for each vibration being of course directly proportionate to the length of the gate from its pivot or point of suspension downward.

To sum up, the following peculiarities are found in and are essential to the successful practical operation of my pendulous gate: First, it must swing into and across a race through which all the type pass; second, it must swing from the rear in order to throw the type forward and prevent rebound; third, it must have a beveled upper face and a straight lower face; and, fourth, its pivot or point of suspension must be at or close to the upper end of said beveled face.

I am aware that pendulous gates have before been used in type-setting machines, but I am not aware that these peculiarities have ever before been given to or combined in such a gate.

I am also aware that a series of type-cases have been arranged in rows, one behind another, and perpendicular to races extending beside and common to all the cases of a row, said races being also inclined at an angle of about forty-five degrees. This I do not claim and do not use. My cases are arranged in horizontal or practically horizontal tiers, one tier above another, and the races are arranged in a nearly vertical position, so that the time required for a type to fall from the top to the bottom of my race is so short that there is no liability of a type ejected from a lower case immediately after one from an upper case falling to the type-line ahead of the one first ejected. In other words, the descent is so nearly vertical that even when the keys are manipulated with great dexterity each type falls to the type-line before the next one fairly starts. This is not and cannot be the case where the type cases and races stand at forty-five degrees or thereabouts to the horizon.

I believe myself to be the first to arrange type-cases in horizontal or practically horizontal tiers, one tier above another; and by this arrangement I am enabled to attain a rapidity and certainty of operation that I believe to be impossible with any other arrangement yet proposed, beside which I am enabled to make the machine exceedingly compact, and I avoid entirely the resistance offered to the movement of the ejecting-fingers by the weight of a column of types supported one upon another, as is inevitable in any machine in which the type-cases are inclined to any considerable extent.

As the type fall it is necessary that they be moved forward along the line-galley W, out of the way of the falling type, and for the purpose of thus carrying the line forward, which is also necessary in order to bring the line within easy reach of the assistant, I provide an L-shaped pusher or feeder, Z, which is suspended from one end, the lower arm projecting forward through an opening, $f'$, immediately behind the line of the type and beneath the gravitating gate Y. This pusher is connected through the medium of an elbow-lever, $g'$, and rod $h'$, with a lever or pivoted frame, A', the front-bar, $i'$, of which extends from one side of the key-board beneath all the key bars or levers, so that every time a key is depressed, whatever that key may be, the bar $i'$ will be depressed, the inner end of the lever A' and the rod $h'$ lifted up, the elbow-lever $g'$ rocked upon its pivot, and pusher Z thrown forward against the type, so that whatever may be the rate of operation of the machine the pusher will move forward for every type that descends. The pivot of frame or lever A' is so located with reference to the weight of the frame and its attendant parts that the front bar is raised and the rear arm of the lever depressed automatically; but for very rapid working it will be found advisable to add a spring for producing a quick return of the plates to their normal positions. The galley X inclines downward slightly, so that the type entering the same line by line naturally tend to slide downward therein, and will remain in the position given them. The line-galley W, which at $o$ stands upright, is tipped laterally between that point and the main galley X, the tipping being, however, so gradual as not to interfere at all with the free movement of the line of type through it.

To prevent the line of type from being moved too suddenly forward or from falling down by reason of a sudden movement, and for the further purpose of causing them to stand close together and produce a solid line, I provide the upper side of the line-galley with an adjustable friction device consisting of a brush, B', behind which I preferably place springs C', to urge the brush forward toward the line of type as far as such movement is permitted by the adjustable screws D'. While offering an ample amount of friction to straighten and solidify the type-line, the bristles do not offer sufficient resistance to materially increase the force required to move the type-line forward. The galley X is of ordinary form and rests upon an inclined bed or support, E', to which it is made fast by clamps F', consisting of hooks or overhanging arms $j'$, the stems or shanks of which pass through the bed or support E', and are furnished below the same with eccentrics or cam-levers $k'$, by which they may be drawn down upon the frame of the galley or upon the side-stick G' employed therein, against the lifting action of springs $l'$. (Shown in Figs. 1, 2, and 18.) The side-stick is set at any desired distance from the side of the galley and parallel therewith, as usual, and the clamps being firmly drawn down serve to hold the galley in position upon its bed, and also to hold the side-stick in place within the galley. When it is desired to remove the galley or change the position of the side-stick, the clamps are unfastened by merely swinging the levers or hand-pieces $k'$, as will be readily understood upon examining Fig. 20. The side-stick is in all cases brought just in line with the end of the line-galley W, as shown in Fig. 19, and an adjustable gage, H', slotted and held in place by a set-screw, I', is set exactly in line with the side of the galley X, which forms the side or boundary of the space to be occupied by the type-form. As the type-line is fed forward along the line-galley W, the attendant, using an implement designed for the purpose, separates therefrom the longest line or portion that can be received by the galley X in the space between its side stick G', and slides the same along until its end comes against the gage or stop H', in which position it is left. Immediately above the type-line and line-galley is a movable head or bunter, J', projecting forward from the upper end of an elbow-lever, K', which lever is pivoted at its lower end to the frame of the machine, and has its horizontal arm connected by a rod, L', with a treadle, M', by which the rod and the elbow-lever-arm may be drawn down when required against the upward action of a spring, N'. The spring N' serves to hold the lever K' and its head or bunter J' up or in a position ready to be drawn down against the short line of type separated from the main line by the attendant, which operation is performed each time a line is thus separated and moved up to the gage H'. As the bunter J' moves forward it presses the line of type into the galley and moves the entire form forward therein against the moderate friction of a head or block, O', placed in the galley before the type to keep them in position. As the width of the form is changed from time to time it is of course necessary to vary the width of the bearing-face of bunter J' to correspond; and for this purpose I construct said face in two parts, $m'$ and $n'$, arranged to slide one upon the other, and both formed with a dovetailed groove at the back to fit a corresponding rib, $o'$, formed upon the head or bunter, as shown in Fig. 20. The parts $m'$ $n'$ are each of a width less than the height of the type, and, being flush with each other on their front face, afford a plane and uniform surface to bear against the type-line. The parts are preferably made to fit sufficiently close to retain their proper positions through friction alone, though set-screws may be employed to hold them, if desired. The central race-bar is preferably covered with a glass plate, in order that the operator may readily see, in case the type becomes clogged, the point at which the clogging occurred, and this covering-plate should be readily removable to give access to the races.

Those type which are most frequently used should be grouped in the lower cases as much as practicable.

When a type-case becomes empty, it is simply necessary to withdraw it through back plate, C, detach the follower-hook, secure the weight-cord on the comb or rack provided for that purpose while going after another case, attach the hook to the follower of the fresh case, and slide the case to its place. Ordinarily assistants will be employed to fill and replace the type-cases, this work being performed rapidly and accurately by children.

To insure the proper guiding of the cases to position, grooved bars may be extended from plate B to plate C, though this is not essential.

In speaking of the type-cases as consisting of slotted bars with solid ends I do not mean to convey the idea that they are necessarily formed by slotting or grooving a solid bar, since they are, in fact, generally made of sheet metal, either bent into form or cut into suitable strips and parts, and afterward soldered, brazed, or riveted together.

Having thus described my invention, what I claim is—

1. In a type-setting machine, the combination of a series of type-cases arranged one above another in an approximately horizontal position, and a race passing by the side of the several cases of the series and arranged to receive type from each, substantially as set forth.

2. In a type-setting machine, the combination of a series of substantially horizontal type-cases arranged in tiers, one tier above another, the cases of one tier being arranged in line with those of other tiers, and races passing the outlets of the cases, and each common to cases in the different tiers.

3. In combination with two or more approximately horizontal type-cases arranged one above another and having lateral outlets for the type, a race having a slot in its side extending from case to case, and adapted to receive the type from the outlets of the different cases.

4. In a type-setting machine, the combination of a central bar, a series of race-bars inclining thereto and communicating with the race of the central bar, and a series of approximately horizontal type-cases arranged in tiers one above another, and with the cases of one tier in line with those of the next forming a series, whereby each race-bar is enabled to receive type from all the cases of the series which it passes, and all the races are caused to deliver their type into the central race.

5. In a type-setting machine, a series of approximately horizontal type-cases arranged in tiers or rows, one tier above another, the cases of each row being in line with those of tiers above and below, each row thus forming a series or group, each group containing cases of type of a certain single class as regards width or thickness, and race-bars, one passing and common to all the type-cases of a series, and having a raceway large enough to permit the free longitudinal movement of the type of its series therein, but not large enough to permit said type to turn transversely.

6. In a type-setting machine substantially such as described, the combination of type-cases arranged in groups or series, according to the thickness of the types, and a race-bar for each series, having a raceway of such size as will permit the free longitudinal movement within it of each type of its series, but too narrow to permit said type to turn therein.

7. In a type-setting machine, the combination, with supporting-plates B and C, having perforations $a$, of type-case D, extending from one plate to the other, supported therein and separately removable therefrom, substantially as shown and described.

8. In a type-setting machine, the combination of supporting-plates perforated to receive type-cases, and type-cases provided each with a shoulder at or near the forward end, to limit the passage of the case through the forward plate.

9. In a type-setting machine, the combination of plates B and C, each provided with openings $a$ for the insertion of type-cases, the openings of plate C being formed with a lateral enlargement, and type-cases D, each provided with a follower, and a lateral eye for the attachment of a weight-cord, substantially as set forth.

10. In a type-setting machine, a type-case holder or frame consisting of plates B and C, each provided with openings $a$ to receive type-cases, the openings in each plate being arranged in horizontal tiers or rows, those of one tier in line with those of other tiers, as and for the purpose explained.

11. The herein-described type-case for use in a type-setting machine, consisting of a longitudinally-slotted bar having an abutment or solid portion at its forward end for the type to bear against, a lateral outlet immediately in rear of said abutment, and a transverse passage or opening through said abutment to permit the passage of an ejecting-finger.

12. The herein-described type-case, consisting of a bar having a longitudinal groove, $d$, closed at its forward end by an abutment, $f$, provided with end mortise, $j$, outlet $e$, immediately in rear of abutment $f$, longitudinal slot $n$, follower E, and a cord hook or arm extending from the follower through side slot, $n$, all substantially as described and shown.

13. A type-case for type-setting machines, having a longitudinal slot to contain the type, an abutment at one end for the type to bear against, an outlet immediately in rear of the abutment, and a pusher movable longitudinally within the slot, the face of the abutment being slightly beveled or undercut to prevent the type from passing through the outlet too easily.

14. In combination with a main race, $o$, through which all the type pass in a single line to the line-galley, and with front plate, I, covering said race, a pendulous gate, Y, formed with a beveled upper end or face extending downward across the race from rear to front, and with a straight face below the beveled portion, said gate being of the width of the main race only, and a suspension-pivot for said gate located at or near the upper end of the beveled portion thereof, as and for the purpose explained.

15. In combination with type-case D, having slot n, and provided with follower E, cord-hook l, having a polygonal stem fitted in a corresponding socket in the follower, and a lateral arm extending through slot n, and provided with an eye to receive a weight-cord, substantially as shown and described.

16. In combination with frame or plates B C, a type-case, D, passing through said plates, and having a shoulder to limit its forward movement, a follower within the case, arranged to bear against the type therein and to press them against an abutment at the forward end of the case, and a weight connected with the follower and serving to press the same forward, whereby it is caused both to feed the type forward within the case and to carry and hold the case forward within its supporting-frame.

17. In combination with frames B C, and type-cases D, arranged therein, substantially as shown and described, follower E within the type-cases, cord g, attached to the followers and passing about pulleys h i, and rods r, running between the cases and serving to prevent the cords from interfering therewith or with their cord-hooks, substantially as set forth.

18. In combination with type-cases D and followers E, cords g, attached to the followers and passing about suitable guides or pulleys, and weights F, provided with guides, substantially as shown, to prevent them from interfering with each other.

19. In combination with a main race-bar having a central race and a series of branch races meeting the central race at an angle, a series of supplemental race-bars applied to the main race-bar and forming continuations of the branch races, substantially as and for the purpose explained.

20. In a type-setting machine, the herein-described supporting-frame for type-cases, consisting of plates B C, both provided with openings a, to receive the type-cases, the plate C being further provided with a comb or rack to hold the weight-cords of the type-case followers, substantially as set forth.

21. In combination with a series of type-cases and ejecting-fingers therefor, key bars or levers for actuating the ejecting-fingers, provided with finger-buttons arranged in rows, bell-crank levers connected by rods with the key-bars and ejecting-fingers, respectively, and pivoted to a supporting-plate each at a like distance horizontally from the end of the key-bar, and a series of pivot-rods, whereby a uniform leverage for all the key-bars is secured.

22. In combination with a horizontal row of type-cases, each having a transverse opening for the movement of an ejecting-finger, a series of ejecting-fingers having their rear ends extended to different distances from the ends of the type-cases, whereby space is secured for the attachment of operating-rods, one to each bar, in the same horizontal plane and in parallel lines.

23. In combination with a horizontal series of type-cases, two series of ejecting-fingers, jointly comprising a finger for each case, the finger of each series extending back each farther than the one preceding, the fingers of one series having the rear extensions formed above and those of the outer series having the rear extensions below the middle line of the fingers, substantially as and for the purpose explained.

24. In combination with two type-cases, D, located in the same horizontal plane, two ejecting-fingers, one for each of said cases, one having its rear end cut away above the middle line and the other similarly cut away below its middle line.

25. The combination, substantially as herein described and shown, of a type-case, D, having outlet e, ejecting-finger G, plates O and y, bell-crank or lever P, pivoted to plate O, rods Q R, the former provided with a collar and bearing at opposite ends against collar x and plate y, and spring z and key-bars or levers S.

26. In combination with type-cases and ejecting-fingers therefor, key-bars or levers connected with said fingers, substantially as shown and described, and rods or stems b', provided with buttons v, attached to the key-bars, provided with spring d' and collars e', and passing through plates U and V, between which said collars and springs are located, substantially as shown and described.

27. In combination with type-cases and with ejecting-fingers therefor, key-bars or levers for actuating the ejecting-fingers, elbow-levers for changing the direction of the motion produced by the depression of the key-bars, and pivot-rods for said key-bars, the elbow-levers and the pivot-rods being set back from the key-board to correspond with the positions of the key-bar buttons in the key-board, whereby a uniform leverage and movement is secured for each.

28. In combination with a type-case and an ejecting-finger therefor, an elbow-lever connected by a rod with the ejecting-finger, a key-bar or lever pivoted at one end, a loop encircling said lever, a rod extending from the elbow-lever to and screwing into said loop, and a stem attached to the key-bar, provided with a shoulder encircled by a spring and passing through two plates, between which the collar and spring are located and against the lower one of which the spring bears, substantially as shown and described.

29. In combination with main race $o$ and mechanism, substantially as described, for delivering type into the same successively, face uppermost, a line-galley having a short horizontal portion to receive the type in a vertical position, and then inclining forward from the race, whereby the type are caused to fall away from the race at their upper ends and to move forward upon the application of slight force.

30. In combination with galley X, head or bunter J', movable to and from the same and provided with adjustable face-pieces $m'\,n'$, substantially as and for the purpose explained.

31. In combination with galley X and bunter J', provided with rib $o'$, face-pieces $m'\,n'$, grooved to fit said rib and arranged to slide one upon the other, substantially as shown and described.

JOHN L. McMILLAN.

Witnesses:
ARTHUR F. BELLINGER,
GEORGE M. LEE.